April 6, 1926.
W. THOMAS
1,579,415
FLUID PRESSURE RECORDER
Filed Oct. 29, 1920
3 Sheets-Sheet 1
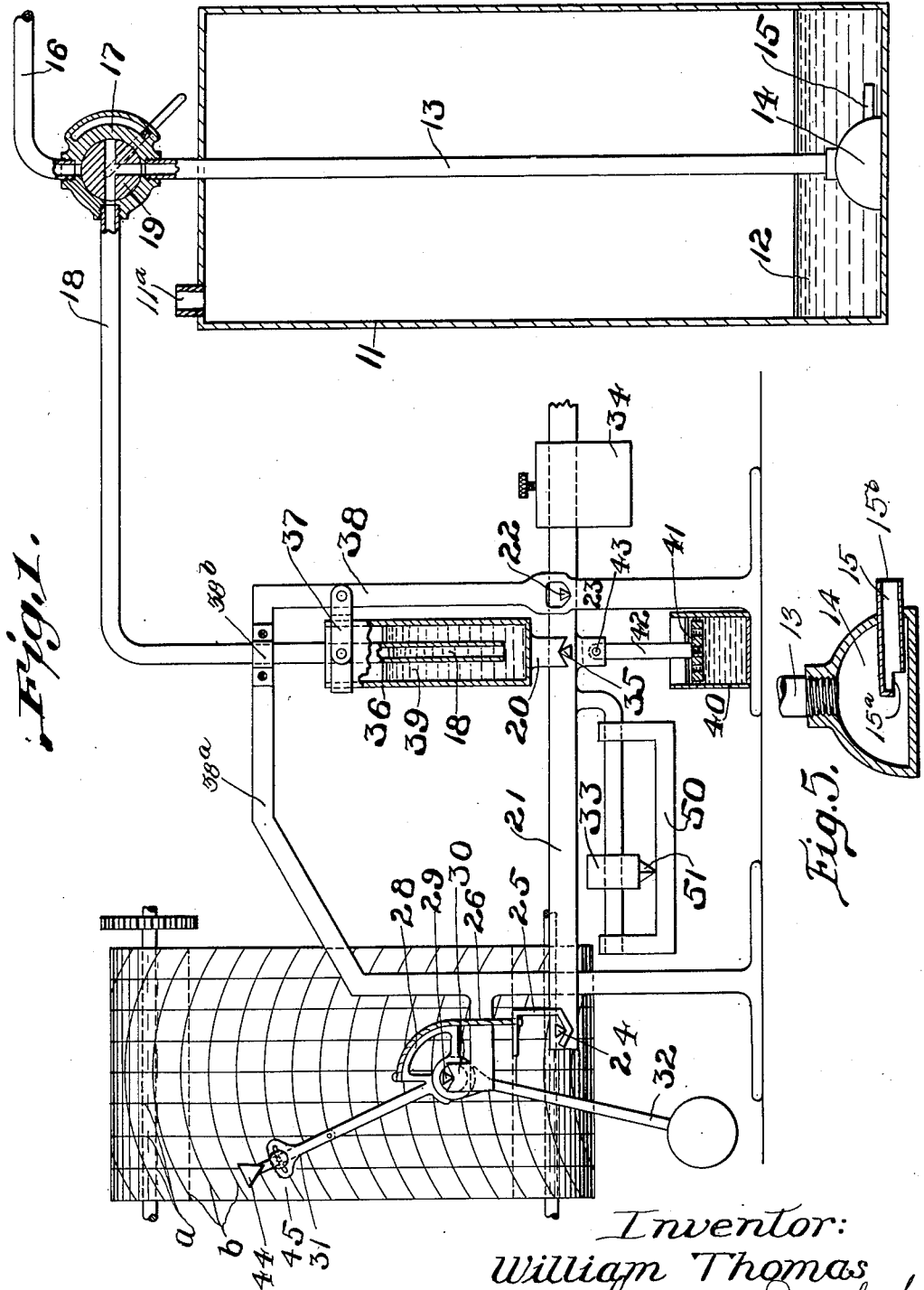

April 6, 1926.

W. THOMAS 1,579,415

FLUID PRESSURE RECORDER

Filed Oct. 29, 1920  3 Sheets-Sheet 2

Inventor:
William Thomas,
by Wright, Brown, Quinby & May
attys

April 6, 1926.  1,579,415
W. THOMAS
FLUID PRESSURE RECORDER
Filed Oct. 29, 1920  3 Sheets-Sheet 3

Inventor:
William Thomas
by Wright Brown, Quinby & Hay
Attys.

Patented Apr. 6, 1926.

1,579,415

UNITED STATES PATENT OFFICE.

WILLIAM THOMAS, OF WEST NEW YORK, NEW JERSEY, ASSIGNOR TO PNEUMERCATOR COMPANY, OF NEW YORK, N. Y., A CORPORATION OF MAINE.

FLUID-PRESSURE RECORDER.

Application filed October 29, 1920. Serial No. 420,383.

*To all whom it may concern:*

Be it known that I, WILLIAM THOMAS, a citizen of the United States, residing at West New York, in the county of Hudson and State of New Jersey, have invented new and useful Improvements in Fluid-Pressure Recorders, of which the following is a specification.

The object of the present invention is to provide a means for accurately indicating or recording values in relation to bodies of liquid or gas, and particularly in relation to liquids in tanks or other containers. One specific use which the invention is designed and adapted to serve (which is here mentioned for illustration and without limiting intent) is to measure, and make a continuous record of, either the depth or the quantity by volume or weight, of oil stored in tanks, either by direct reading in terms of the above-mentioned values, or in other terms from which such values may be determined by calculation. Oil is commonly stored at the fields where it is produced, and at the establishments of large users and distributors, in tanks of great size which may be 30 feet or more in height and of still greater horizontal dimensions. Evidently, in order to determine depth or quantity of the liquid in such tanks with any near approach to exactness, very great delicacy and accuracy in the measurement of the liquid contents is necessary, since an error of a small fraction of an inch in measuring the depth may mean an error of a great many gallons or barrels or pounds in the determination of the quantity of such contents. It is necessary, also, that the recording instrument have a range commensurate with the height of the tank and be highly sensitive at all points within its range, in order that it may accurately measure the amount of contents at all stages between emptiness and fullness.

While means have been provided heretofore for measuring and indicating visually with sufficient accuracy the present depth and quantity of liquid in tanks and elsewhere, there has never been produced a practical instrument adapted to make a permanent record for future reference of such depths and quantities, and the variation thereof from time to time, throughout the necessary range, and with the necessary accuracy at all points in such range.

I have accomplished the object and purposes above indicated by devising a combined apparatus which in its entirety comprises generally a means for creating or entrapping pneumatic pressure equal to the head of liquid above a given reference level in a tank or other body of liquid, and a mechanical apparatus affected and operated by such pressure and equipped with a marker which is moved proportionately to positive or negative increments in the pressure to inscribe a line on a moving record sheet; the sheet having appropriate indications, such as lines or marks properly spaced from one another to show in connection with the recorded line either depth, volume, weight, or other value desired to be known, by direct reading, or the amount of the actuating pressure. The recording mechanism is of such a nature that it is substantially frictionless; is not subject to the resistances and aberrations, causing inaccuracy and lack of sensitiveness, of spring tubes, diaphragms, and such like devices which are distorted in form by pressure; and seals the compressed fluid acting on the mechanism.

The foregoing statement of the object and nature of the invention is not to be construed as a limitation in the scope for which I claim protection; for the features of the combined apparatus above briefly described are applicable for either recording or visually indicating, without recording, the values of fluid (gaseous or liquid) pressures of any sort produced in any way and for any purpose, wherefore I claim such features broadly and without restriction to their association with the entire combined apparatus.

I will now describe in detail the embodiment of the invention and certain modifications thereof which I have illustrated in the drawings furnished with this specification. In said drawings, Figure 1 shows a side elevation, partly diagrammatic, of one form of the apparatus.

Figure 5 is a detail sectional view of the terminal of the pipe line shown in Figure 1.

Figure 3:
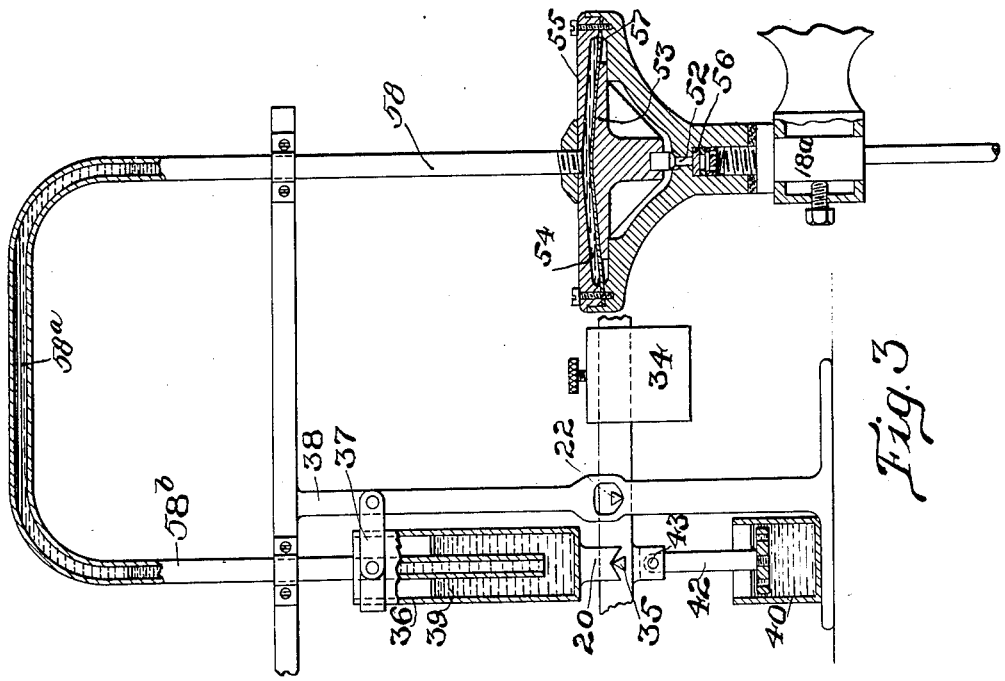
Figures 2, 3 and 4 are partial views showing modifications of different parts of the apparatus.

Describing now the particular embodiment or embodiments of the invention shown in these drawings, 11 represents diagrammatically a tank containing liquid 12, which may be oil or anything else. The tank typifies any container of any dimensions, proportions and shape. 13 is a pipe line running into the tank and terminating in a large chamber 14 from which there extends a lateral tube 15 open both inside and outside of the chamber 14, at 15$^a$ and 15$^b$ respectively, and forming the submerged orifice of the pipe line. Said chamber is otherwise closed. This tube establishes the reference level from which the depth or height of the liquid is measured, and is hereinafter called a zero tube. Air under pressure is supplied from a tank or a pump by a pipe line 16 which is connected through a valve casing 17 with the pipe 13, and also with a branch 18. A valve 19 in the casing 17, here represented as a simple three-way cock, is operable either to direct air under pressure from the supply (pump, tank, etc. typified by the pipe 16) to the line 13, or to shut off the line 13 from the supply and connect it with the branch 18; the latter condition being the one shown in Figure 1. When air at greater pressure than that equal to the head of liquid in the tank at the zero tube 15 is admitted through valve 19 to the pipe 13, it expels any oil which may have entered said pipe and the chamber 14, down to the level of the zero tube, and the excess of air bubbles through the oil to the upper part of the tank and escapes through the vents with which such tanks are customarily provided. An opening shown at 11$^a$ in Figure 1 may serve in the present diagrammatic drawings to typify any such vent. Then upon turning the valve 19 into the position shown in Figure 1, this valve first shuts off the pipe 16 and then connects the pipes 13 and 18, and the pressures in the latter pipes become equal and of an amount which exactly balances the head of oil above the zero tube.

The operation of blowing out the line 13, just described, is necessary only when, through leakage of air from the system, or through putting more oil in the tank, oil has entered and risen in the pipe 13. In such cases the air pressure in the pipes 13 and 18 is equal only to the difference in head between the oil in the tank and that in the pipe 13 and as the head of the oil column in said pipe is indeterminate, the indication given by the marker would be of no value. But by blowing out the pipe 13 and chamber 14 in the manner described, the oil level in the pipe line is lowered to that of the zero tube, which is taken as the zero level of the tank, or the reference level with regard to which the depth of oil in the tank is measured. Ordinarily in blowing out the line it is necessary to maintain the connection between pipes 16 and 13 for only a brief interval of time. The operator may know when the oil in pipe 13 has been expelled to the level of the zero tube 15 by that fact that the recording mechanism becomes stationary after having moved in a manner indicating an increasing pressure or head. After shuttting off the supply pipe 16, if the air in the pipe 13 is at a pressure higher than the external liquid, enough air continues to flow out of the zero tube to bring the liquid head and pneumatic pressure to an exact balance. It is a condition of the apparatus that the air supply furnished through the pipe 16 be at least as great, or capable of being brought to a pressure as great, as that balancing the liquid head when the tank is full of oil. Such pressures are obtainable by any suitable pumps or compressors and may be measured by any ordinary pressure gages.

The branch 18 leads to a load-applying member 20 of a recording mechanism, which comprises a beam 21 having its fulcrum provided by knife edge trunnions 22 resting on a fixed support 23, and having other knife edges 24 bearing upon a stirrup 25 connected by a flexible strap 26 with a segment 28 which is supported by knife edges 29 on a bracket 30, and carries a pen arm 31 and a weighted arm 32. The latter arm is suitably connected to the quadrant member 28 to apply a counter resistance to the loading of the beam. There are other weights 33 and 34 on the beam, indicated as being adjustable for suitably counter-balancing the parts of the machine and for adjusting the positions and movement of the pen arm (or equivalent index) according to the circumstances of loading. The loading of member 20 is imposed upon the beam through knife edges 35 (fixed to the beam and defining the loading point of the latter) and it supports, preferably as an integral part thereof, a cup 36 which is guided by a link 37, pivoted to a stationary upright 38. Thereby the cup and load member are prevented from tipping over but are enabled to rise and descend freely and without appreciable frictional resistance. The cup contains a quantity of liquid 39, which generally would be mercury, but in certain cases may be another liquid, to provide a seal for the end of the branch pipe 18, which dips into the cup and into the mercury contained therein. Pipe 18 is fixed immovably to the frame member 38$^a$ by a strap 38$^b$.

A dash pot or damper 40 is provided to check secondary vibrations of the beam and make its movements gradual and steady. The dash pot, or stabilizer as it may be called, consists of a cup containing fluid (oil or glycerine, for instance), and a piston 41 having passages of such number and area (or otherwise fitting so loosely in the cup) that it may move through the liquid under a determined character of resistance. The piston is connected with the beam by piston rod 42 and a pivot 43.

Adjacent to the pen arm, and so disposed that the pen 44 on such arm may pass over it, is a record tape or sheet 45 represented as passing over drums, one of which may be driven by clockwork or other regularly moving motor. For this part of the apparatus I may use any kind of record sheet-supporting and driving means, and any form of record sheet, whether an endwise traveling tape or a rotating disc, which are or may be used with any sort of recording instrument. The record sheet is preferably originally equipped with reference lines $a$ extending in the direction of travel of the sheet and suitably spaced apart to designate, in connection with the position of the pen, the values recorded or indicated, which may be in terms of pressure or of depth, weight, volume, etc. of the liquid in the tank. Preferably, also, transverse lines $b$ are carried by the sheet spaced and designated to indicate elapsed time in the travel of the sheet past the pen. In a chart of other form than that shown, the lines $a$ and $b$ will have other dispositions, according to principles well understood in the art.

The pen 44 on the end of the arm 31 represents and typifies any sort of marker or index adapted to be moved by any means from, or by any part of, the recording mechanism. Preferably the pen is adjustable laterally of the arm; and it may be mounted for that purpose by various means, one of which is shown in the drawings as comprising a shank on the pen, pivoted to the arm, and carrying a stud which passes through a slot in a widened part of the arm and is equipped with a clamp nut.

The pneumatic pressure in the pipe line and its branch 18, acting upon the sealing liquid 39 transmits force upon the loading point 35 of the beam 21 proportionally to the intensity of the pneumatic pressure and the area of the tube orifice. If, for example, the intensity of pressure is one pound per square inch, and the area of the orifice is one square inch, a pressure amounting to one pound is there applied: but if, as is usually the case, the tube orifice is less than that area, then the actual load imposed is in like measure less than the unit intensity of pressure (expressed in terms of pressure per square inch). The pipe or tube 18 itself is fixed so that it cannot be displaced by the reaction of the fluid pressure, being clamped to a part of the frame as before stated, or any other suitable rigid support. The sealing fluid (if any) in the tube, and the liquid between the tube orifice and the member 20 acts as a fluid piston in the transmission of pressure, and in order that this action may be applied fully upon the loading point, the tube orifice is directed toward such point.

The movable load-receiving member and beam are thereby moved, and the beam pulls upon the strap 26 to rotate the quadrant and swing the pen arm 31 and the weighted arm 32 until the resistance of the latter becomes great enough to balance the pressure. As the weight on the arm 32 acts with a progressively increasing effective leverage, its displacement is approximately proportional to the intensity of the pneumatic pressure; and it exerts a corresponding counter force to return the mechanism when such pressure diminishes in intensity. Thus the pen is shifted back and forth by distances proportional to varying fluid pressures and in directions corresponding to increase and decrease (or positive and negative increments) respectively of the pressure. Thus the pressure existing in the pipe line and the variations taking place therein from time to time, proportional to differences in the depth of liquid, due to withdrawing liquid from the tank or putting more liquid therein, are effectively transferred to the weighing machine and translated upon the chart 45 in the form of a line which, with reference to the previously ruled reference lines, furnishes a continuous record of varying tank conditions.

Recorders may be made according to the principles of this invention with whatever range may be required, and may show the variations of depth between any practical limits upon a sheet of any desired width, since by properly proportioning the lengths of the various arms in the machine (arm 21 from 35 to 24, arm of segment 28, and arm 31) and properly determining the diameter of the outlet from tube 18 and the values of the counter weights, the movement of the pen for given pressure differences may be made anything desired, within reasonable limits. And the instrument is highly sensitive and accurate, without appreciable error, at all points in its range of indication because there is a frictionless fluid piston at the point where pneumatic pressure is converted into motion, its accuracy is not sensibly affected by temperature changes there is no resistance of metal to be overcome as in the case of gauges having metal members which are distorted by presure, and all the moving parts receive and transmit pressure and motion through knife edge bearings, which are practicaly frictionless.

It is to be understood that although the drawings show only one side of the weighing instrument, knife edges at the opposite side are provided wherever necessary to support stably the movable parts to or by which pressure is applied.

Since in the use of the invention for measurements of liquids the pneumatic pressure measured is dependent upon the weight of the liquid, the specific gravity of the liquid is a factor to be taken into account when converting the movements of the recording pen, or other indicator, into terms of depth and volume of liquid. On this account and also because liquids of different specific gravities may be measured in the same tank, and the same liquid may vary in its specific gravity with change of temperature, I have made provision for adjusting the instrument to meet changing specific gravity conditions. The adjustable character of the weights 33 and 34 is one form of means to that end because adjustment of either in the only path permitted increases or decreases the length of the arm on which it acts, and therefore alters the moment or, as it might be called, the intensity of the force which it exerts on the instrument, corresponding to a variation in the intensity of the force exerted by the pneumatic pressure, which is dependent upon the specific gravity of the liquid. Either of the weights 33 and 34 may be used to the exclusion of the other for this purpose; or the weight upon the arm 32 may be made adjustable and used in conjunction with the other weights, or exclusively.

Figure 2:
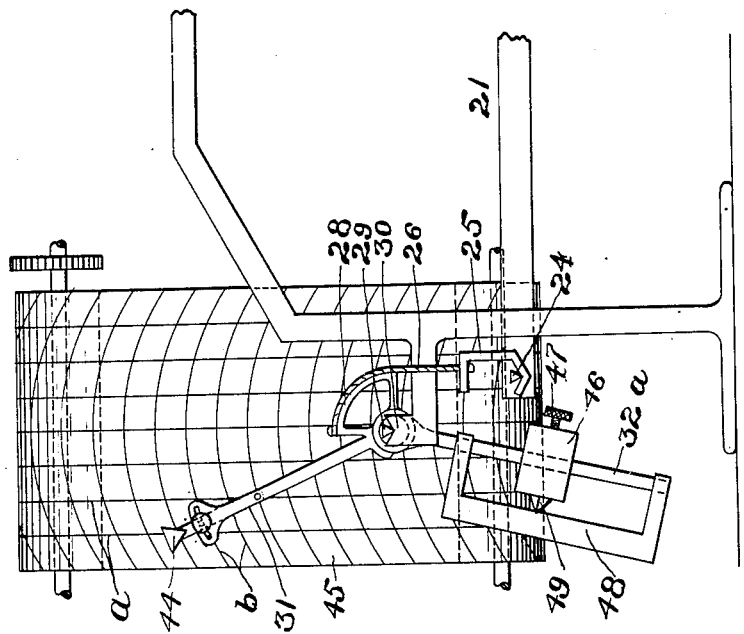

A modification in which the last named weight may be adjusted is shown in Figure 2, where a weight 46 is shown as adapted to slide on an arm 32ª (equivalent to arm 32) and is provided with a set screw 47 for securing it. A plate 48 secured to arm 32ª runs beside the path through which an index 49 on the weight travels, and such plate is adapted to carry marks indicating specific gravities. Evidently, shifting of this weight alters the moment arm on which it acts and so enables a greater or less actuating fluid pressure to move the pen arm through a given distance as this moment arm is lengthened or shortened. A similar scale plate may be arranged beside either of the adjustable weights, as indicated in Fig. 1 by the plate 50 shown beside the weight 33, which carries an index 51. The adjustable character of the pen enables it to be set exactly at the zero position when any of the adjustments is made.

Figure 3 illustrates a modification in the fluid pressure applying means adapted to be used with the recording instrument for recording exceedingly high pressures beyond the range which the instrument shown in Figure 1 could be caused to measure without making the depth of the mercury seal 39 impossibly great. Accordingly, a differential piston or plunger is interposed between the source of pressure and the recording mechanism. This piston comprises a part 52 having a relatively small area exposed to the fluid pressure in a pipe 18ª, and a part 53 having a relatively large area which transmits pressure through a body of mercury 54 contained in a chamber 55. Diaphragms 56 and 57 of highly flexible material are mounted across the opposite ends of the piston to avoid necessity of packings which would oppose resistance. These diaphragms may be of very elastic vulcanized rubber whereby, and also because the movement of the piston need be very slight, they oppose inappreciable resistance. A tube 58 of much smaller internal area than the piston end 53 leads from the chamber 55. Thus a column of mercury may be raised in the tube 58 high enough to balance the impelling fluid pressure by a very small movement of the piston. The pressure acting through this column is transmitted by a body of lighter liquid in a horizontal connecting portion 58ª of the pipe upon a column of mercury in the pipe section 58ᵇ which dips into the cup of the load-receiving member. The pressure thus transmitted is applied to the recording apparatus in the same manner as before described to actuate the indicator or marker and to make an indication and record of the actuating pressure.

Figure 4:
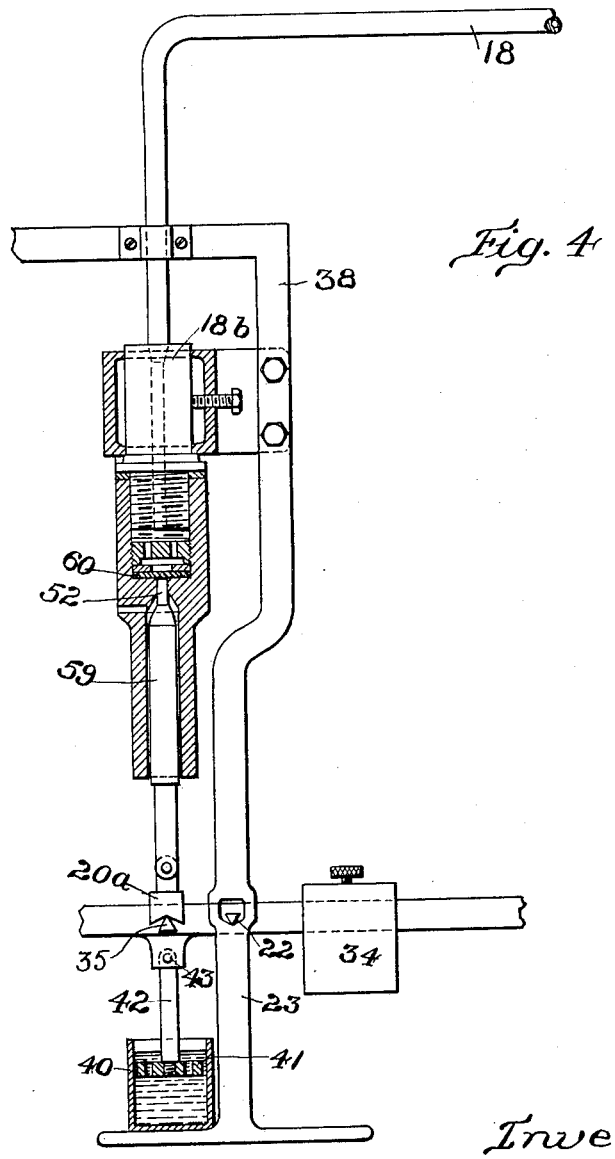

Another modification, which is shown in Figure 4, consists in the provision of a solid piston for transmitting fluid pressure directly to the beam of the recorder. In this case the piston 59 is confined in a guidway and receives pressure upon its upper end from the compressed air in the conducting pipe 18ᵇ through the flexible diaphragm 60; and it delivers pressure upon the knife edges 35 of the beam through a notched block 20ª, which is pivoted to the piston in order to compensate for the curvilinear movement of the loading point 35. The conducting pipe and the guide for the piston are rigidly supported independently of the recording mechanism, as are likewise the pipe 18 and the pipe section 58ᵇ of the previously described forms.

It will be appreciated from the foregoing explanation that the principle of the invention involves the application of elastic fluid pressure, in a manner equivalent to the imposition of a solid weight, upon a substantially frictionless balanced mechanism having capability for movement proportional to the amount of the force applied; and further involves the utilizing of gravity as the yielding force resistant to such movement under rising pressure and productive of counter movement with diminishing pressure. My application of the principle eliminates the causes of error inherent in prior pressure recorders and enables apparatus to be constructed having a wide recording range, with substantially equal freedom from error in all parts of such range.

The same principles and the same or an equivalent mechanical apparatus may be applied for a recording pressures derived from other sources and otherwise produced for other purposes than the balancing of liquid heads; and the mechanism so actuated may be designed to show visually, and without recording, the values of such pressures. This is a phase or feature of the invention which I desire to protect by itself alone and without restriction to the complete combination previously described. Each form of the pressure transmission means herein shown comprises essentially a piston, or the equivalent of a piston, acted upon by the fluid pressure and acting to apply pressure to the recorder mechanism. In the one case this piston is part of a body of liquid between the compressed fluid and a movable mechanical part, while in the case shown in Figure 4 it is a solid piston. In both cases the essential principles are the same.

Variations in the construction and design of the recorder apparatus may be made without departing from the spirit of the invention, and I am therefore not restricted in my protection to the precise mechanism here shown, or otherwise than as required by the intent and meaning of the appended claims when interpreted with reference to the new step in the art made by this invention.

I claim:

1. A pressure indicator comprising a mechanism including a load receiving part, a weighted arm connected to said load receiving part and so pivoted that displacements of said part under increasing load turn the arm about its pivot to such extents that the increasing effective movement of the weighted arm balances the applied load, said mechanism including also an indicator movable with displacements of said load receiving part; a conduit containing fluid under pressure, and a freely movable pressure receiving and transmitting element applied to said load receiving part and being arranged to receive pressures from the conduit and to transmit such pressure as a load to the said receiving part.

2. A pressure indicator as claimed in claim 1, in which said indicator is a marker and is combined with a travelling record sheet mounted and propelled past said marker, in contact therewith, in a direction transverse to the movement given to said marker by displacements of the load-receiving part.

3. A fluid pressure measuring apparatus comprising the combination with a conduit in which fluid under pressure is confined, of an apparatus consisting of a load-receiving member, a pivoted arm having a weight at a distance connected to said load receiving member in such a manner that it is oscillated by displacements of such member from a steeply inclined position to a position approaching the horizontal in such a manner that the increasing moment of the weight balances the applied load; and a pressure transmitting medium between the conduit and load-receiving member formed in part as a rigid solid body movable by pressure imparted from the conduit and pressing against said receiving member.

4. The combination of a conduit adapted to contain fluid under pressure, a substantially frictionless gravity balanced mechanism having a point of load application, an indicator movable by said mechanism to distances and in directions proportional and corresponding to increases and decreases in such loading, and a piston interposed between the fluid in said conduit and said point of load application adapted to transmit the pressure of the fluid to said point without appreciable local resistance.

5. A recorder for showing the depth, quantity, or other values in respect to a body of liquid, comprising in combination a pipe line adapted to be submerged in the liquid and having an orifice at a low point therein, means for producing pneumatic pressure in said pipe line sufficient to balance the head of the liquid at the level of said orifice, a branch from the pipe line adapted to contain the same fluid pressure as exists in said line, a mechanism movable in response to pressure, means for transmitting the pressure of the fluid in said branch to said mechanism in a direction to cause operation of the mechanism, and a marker operated by said mechanism in cooperation with a record chart in proportion to the positive or negative increments of the actuating pressure.

6. An apparatus for recording depths, quantities, or other information concerning bodies of liquid, consisting of a pipe line passing into the body of liquid and having a submerged orifice, an external pipe running from said pipe line, both said pipes containing air under pressure equal to the pressure head of the liquid at said orifice, a member movable in one direction under applied pressure, means yieldingly resisting such movement with force progressively increasing in proportion to the extent of the movement, said means being also adapted to move the member oppositely to the first named direction upon diminution of the pressure application, a member interposed between the branch pipe and the first named member arranged to apply the pressure of the fluid in the pipe against the latter, a sealing means preventing escape of the air between the pipe and the last named member, and a marker controlled by and acting proportionally with the movements of the first named member.

7. An apparatus for recording depths or quantities or like information concerning bodies of liquid, which consists of a fluid container adapted to be immersed in the liquid and confining air under pressure equal to the head of the liquid above a given point of submergence, said container having or including a communicating pipe, a pivoted beam having a knife edge fulcrum and a knife edge loading point, a pressure transmitting piston acted on by the air under pressure in said pipe and arranged to transmit the pressure thereof against said loading point, gravity means applied to said beam in a manner to resist movement of the latter under the pressure so applied with a force increasing approximately in proportion to the extent of such motion, and a marker operable by the beam to inscribe a line upon a record chart.

8. A pressure indicator for indicating fluid pressures comprising the combination with a pipe adapted to contain fluid under pressure, of a movable member, pressure transmission means between the pipe and movable member acted upon by the pressure of the fluid in the pipe and arranged to apply force proportional to such pressure against the movable member, and counterbalancing means connected with said movable member and being constructed and arranged to oppose automatically increasing resistance proportional to the intensity of the load and to the movement given to said movable member by the applied load.

9. An apparatus for measuring gaseous pressures comprising the combination with a conduit adapted to contain gas under pressure, of a piston exposed at its end to the pressure existing in the conduit, a guideway in which said piston is movable, a soft and highly flexible diaphragm interposed between the conduit and the piston and arranged to prevent escape of the gas through said guideway while permitting the full pressure of the gas to be imposed on the piston throughout the range of movement of the latter, a pivoted beam, a connection through which said piston is caused to apply pressure to said beam at a point relatively near the fulcrum thereof, and a pivoted arm having a connection with said beam at a point more distant from said fulcrum and movable with the beam between positions in which it is respectively steeply inclined downward from its pivot and approximately horizontal; said arm having appreciable weight, whereby it opposes resistance to movement of the beam induced by the piston in approximate proportion to its position.

10. An apparatus for measuring gaseous pressures comprising the combination with a conduit adapted to contain gas under pressure, of a piston exposed at its end to the pressure existing in the conduit, a guideway in which said piston is movable, a soft and highly flexible diaphragm interposed between the conduit and the piston and arranged to prevent escape of the gas through said guideway while permitting the full pressure of the gas to be imposed on the piston throughout the range of movement of the latter, a pivoted beam, a connection through which said piston is caused to apply pressure to said beam at a point relatively near the fulcrum thereof, a pivoted arm having a connection with said beam at a point more distant from said fulcrum and movable with the beam between positions in which it is respectively steeply inclined downward from its pivot and approximately horizontal; said arm having appreciable weight, whereby it opposes resistance to movement of the beam induced by the piston in approximate proportion to its position, and indicating means movable by said beam and arranged to show values dependent upon the gaseous pressure.

11. An apparatus for measuring gaseous pressures comprising the combination with a conduit adapted to contain gas under pressure, of a piston exposed at its end to the pressure existing in the conduit, a guideway in which said piston is movable, a soft and highly flexible diaphragm interposed between the conduit and the piston and arranged to prevent escape of the gas through said guideway while permitting the full pressure of the gas to be imposed on the piston throughout the range of movement of the latter, a pivoted beam, a connection through which said piston is caused to apply pressure to said beam at a point relatively near the fulcrum thereof, a pivoted arm having a connection with said beam at a point more distant from said fulcrum and movable with the beam between positions in which it is respectively steeply inclined downward from its pivot and approximately horizontal; said arm having appreciable weight, whereby it opposes resistance to movement of the beam induced by the piston in approximate proportion to its position, a marker connected with said beam and movable synchronously therewith, and a propelled chart arranged to travel in contact with said marker and in a direction transverse to the movements of the latter.

12. An instrument comprising a balanced pivoted arm, a piston under elastic fluid pressure arranged to exert force against said arm at one side of its pivot, gravity means applied to resist movement of said arm under increasing fluid pressure with a force increasing in proportion to the amount of such movement, and an index moved by the arm.

13. A pressure responsive instrument comprising a gravity-resisted movable mechanism having means for causing gravity to exert a gradually increasing opposing force in proportion to its movement from one prescribed limit toward another limit, said mechanism including an index showing extent of motion, and a fluid-pressure conversion means constructed and arranged to receive the pressure of an elastic fluid and to transmit the force of such pressure to said mechanism.

In testimony whereof I have affixed my signature.

WILLIAM THOMAS.